US008729725B2

(12) United States Patent  (10) Patent No.: US 8,729,725 B2
Choi  (45) Date of Patent:  May 20, 2014

(54) WIND-COLLECTING TYPE WIND POWER GENERATING APPARATUS INSTALLED ON ROADSIDE

(75) Inventor: Nam Hyun Choi, Daejeon (KR)

(73) Assignee: R&D Project Co., Ltd., Daejeon (KR)

( * ) Notice: Subject to any disclaimer, the term of this patent is extended or adjusted under 35 U.S.C. 154(b) by 47 days.

(21) Appl. No.: 13/479,314

(22) Filed: May 24, 2012

(65) Prior Publication Data

US 2013/0313834 A1  Nov. 28, 2013

(51) Int. Cl.
*F03D 9/00* (2006.01)

(52) U.S. Cl.
USPC ............................................................ 290/55

(58) Field of Classification Search
USPC ............................................................ 290/55
See application file for complete search history.

(56) References Cited

U.S. PATENT DOCUMENTS

| 4,234,289 | A | * | 11/1980 | Lebost | 415/4.4 |
| 4,288,200 | A | * | 9/1981 | O'Hare | 415/4.4 |
| 4,295,783 | A | * | 10/1981 | Lebost | 415/4.4 |
| 4,474,529 | A | * | 10/1984 | Kinsey | 415/4.2 |
| 5,272,378 | A | * | 12/1993 | Wither | 290/1 R |
| 7,427,173 | B2 | * | 9/2008 | Chen | 404/71 |
| 7,744,339 | B2 | * | 6/2010 | Flores Lumbreras | 415/4.2 |
| 7,880,322 | B2 | * | 2/2011 | Cumings et al. | 290/54 |
| 2009/0045632 | A1 | * | 2/2009 | Krauss | 290/54 |
| 2012/0292912 | A1 | * | 11/2012 | Haskell | 290/55 |

FOREIGN PATENT DOCUMENTS

| DE | 3014778 | A | * | 9/1982 |
| DE | 4310094 | A1 | * | 9/1993 |
| DE | 10303134 | A1 | * | 7/2004 |
| GB | 2465219 | A | * | 5/2010 |
| JP | 2012177322 | A | * | 9/2012 |
| KR | 1020100032604 | A | | 3/2010 |
| WO | WO 0131196 | A1 | * | 5/2001 |

\* cited by examiner

*Primary Examiner* — Joseph Waks
(74) *Attorney, Agent, or Firm* — Novick, Kim & Lee, PLLC; Jae Youn Kim

(57) ABSTRACT

Provided is a wind-collecting type wind power generating apparatus installed on a roadside, which performs power generation using traveling wind of vehicles traveling on the road. The wind power generating apparatus includes a power generation main body accommodating a power generator and buried under the ground, a support extending upwardly from the power generation main body, a blade located at the upper end of the support and rotated by wind to drive the power generator, a wind collecting guide surrounding a part of the circumference of the side surface of the blade, rotatably connected to the blade, collecting wind and guiding the wind to the blade, and a cover steering unit protruding from one side of the upper end of the wind collecting guide to rotate the wind collecting guide according to the direction of wind so that a wind inlet is opposite a wind blowing direction.

9 Claims, 6 Drawing Sheets

WIND-COLLECTING TYPE WIND POWER GENERATING APPARATUS INSTALLED ON ROADSIDE

BACKGROUND OF THE INVENTION

1. Field of the Invention

The present invention relates to a wind-collecting type wind power generating apparatus installed on a roadside, which performs power generation using traveling wind generated by vehicles traveling on the road.

2. Description of the Related Art

In general, a wind power generating apparatus generates electricity using the force of wind.

Such a wind power generating apparatus is manufactured in a large size to produce a large amount of electricity, and is installed at a coast or a mountain which is windy to perform power generation.

However, with increasing demand for energy conservation measures, development of small-sized wind power generating apparatuses which produce electricity using a small amount of wind is underway.

As an example of small-sized wind power generating apparatuses, Korean Patent Laid-open no. 10-2010-0032604 discloses "Wind power generating system using traveling of vehicles" which performs power generation using traveling wind generated during traveling of vehicles.

The conventional wind power generating system using traveling of vehicles includes a support unit formed in a vehicle traveling direction on a road and provided with an inlet through which wind is introduced into the support unit and an accommodation unit communicating with the inlet, formed on the side surface of the support unit, a damping induction unit protruding from the side surface of the support unit, extending in the opposite direction to the vehicle traveling direction, inducing wind to the accommodation unit and damping impact when a vehicle collides with the support unit, a rotor located within the accommodation unit and rotated by wind, and a power generating device producing electricity using rotation of the rotor.

In the conventional wind power generating system using traveling of vehicles having the above-described configuration, wind generated when vehicles travel is induced by the damping induction unit, and the wind induced to the damping induction unit rotates the rotor, thereby achieving power generation.

However, the conventional wind power generating system using traveling of vehicles is configured such that the damping induction unit guiding wind allows only wind opposite the vehicle traveling direction to be introduced into the damping induction unit.

Thereby, since wind generated in various directions when the vehicles travel is not used and natural wind generated in various directions is not used, power generation efficiency may be lowered.

Further, if foreign substances, such as stones, are introduced into the damping induction unit, the foreign substances may be inserted between the rotating rotor and the damping induction unit and may thus damage the rotor.

SUMMARY OF THE INVENTION

Therefore, the present invention has been made in view of the above problems, and it is an object of the present invention to provide a wind-collecting type wind power generating apparatus installed on a roadside, which rotates a rotor using natural wind as well as traveling wind generated in various directions to improve power generation efficiency.

It is another object of the present invention to provide a wind-collecting type wind power generating apparatus installed on a roadside, which prevents damage to a rotor due to foreign substrates introduced into the wind power generating apparatus by wind, and reflects light of a vehicle at night to visually alert a driver.

In accordance with the present invention, the above and other objects can be accomplished by the provision of a wind-collecting type wind power generating apparatus installed on a roadside including a power generation main body accommodating a power generator generating electricity and buried under the ground, a support extending upwardly from the power generation main body, a blade located at the upper end of the support and rotated by wind to drive the power generator, a wind collecting guide provided in a shape surrounding a part of the circumference of the side surface of the blade, rotatably connected to the blade, collecting wind and guiding the wind to the blade, and a cover steering unit protruding from one side of the upper end of the wind collecting guide to rotate the wind collecting guide according to the direction of wind so that a wind inlet provided between the wind collecting guide and the blade to introduce wind into the wind inlet is opposite a wind blowing direction.

The blade may include a rotary shaft transmitting driving force to the power generator, and a plurality of wings arranged in a radial manner with respect to the rotary shaft, each wing having a concave central portion to collect wind.

The wind collecting guide may be formed such that an interval between the wind collecting guide and the blade becomes narrowed in an arc shape in a direction from one end of the wind collecting guide forming the wind inlet to the other end of the wind collecting guide.

The wind collecting guide may include a front sealing part surrounding the side surface of the blade from a position opposite the wind inlet to a position orthogonal to the wind inlet.

The wind collecting guide may include wind outlets discharging the wind introduced into the wind inlet to the outside of the wind collecting guide at random positions after guiding of the wind by the wind collecting guide.

A portion of the wind collecting guide opposite the wind inlet may be partially cut out so as to discharge foreign substances introduced into the wind inlet to the outside, and a foreign substance discharge door opening or closing the cut portion of the wind collecting guide may be provided at the cut portion of the wind collecting guide.

The foreign substance discharge door may be rotatably connected to the wind collecting guide by a hinge, and the foreign substance discharge door may be supported by an elastic member so as to close the cut portion of the wind collecting guide by elastic force.

The outer surface of the power generation main body may have a prominence and depression shape so as to firmly fix the power generation main body to the ground.

The cover steering unit may include an extension unit extending from the upper end of the wind collecting guide in the opposite direction to the introduction direction of wind into the wind inlet, and a steering plate protruding in a platy shape from the extension unit and rotating the wind collecting guide via wind resistance.

The steering plate may include a reflective member reflecting light from a vehicle traveling on a road.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be described in detail with reference to the annexed drawings.

First, a wind-collecting type wind power generating apparatus 100 in accordance with an embodiment of the present invention is installed on a roadside where vehicles travel, and may perform power generation mainly using wind generated from vehicles traveling on a road.

Here, the roadside means the side of a road, i.e., one edge of the road or both edges of the road, or the central portion of the road, and the road means a road on which bicycles travel and a footpath on which humans travel as well as a road on which vehicles travel.

Figure 1:
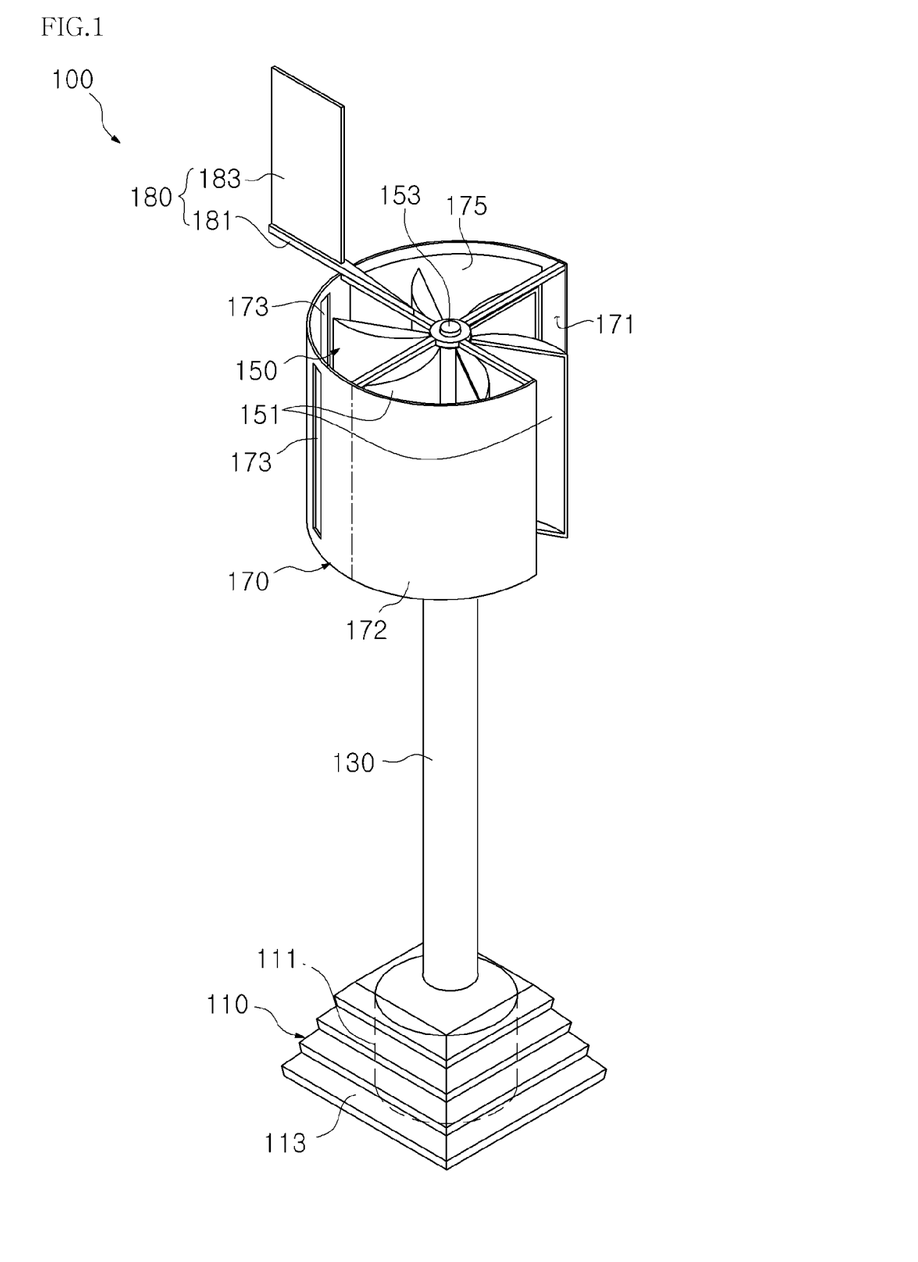
FIG. 1 is a perspective view illustrating a wind-collecting type wind power generating apparatus installed on a roadside in accordance with an embodiment of the present invention.
Figure 2:
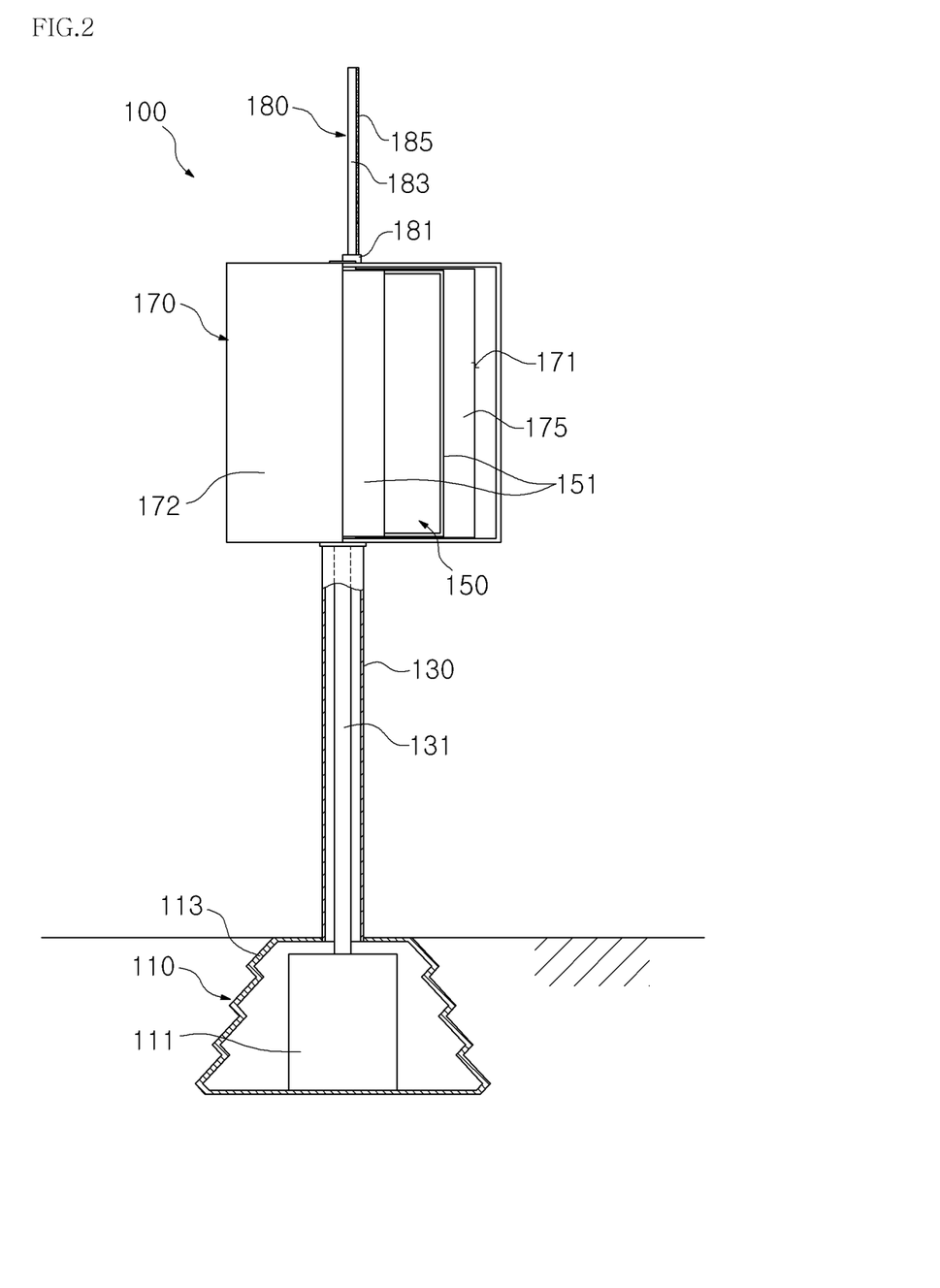
FIG. 2 is a front view illustrating the wind-collecting type wind power generation apparatus in accordance with the embodiment of the present invention.
Figure 3:
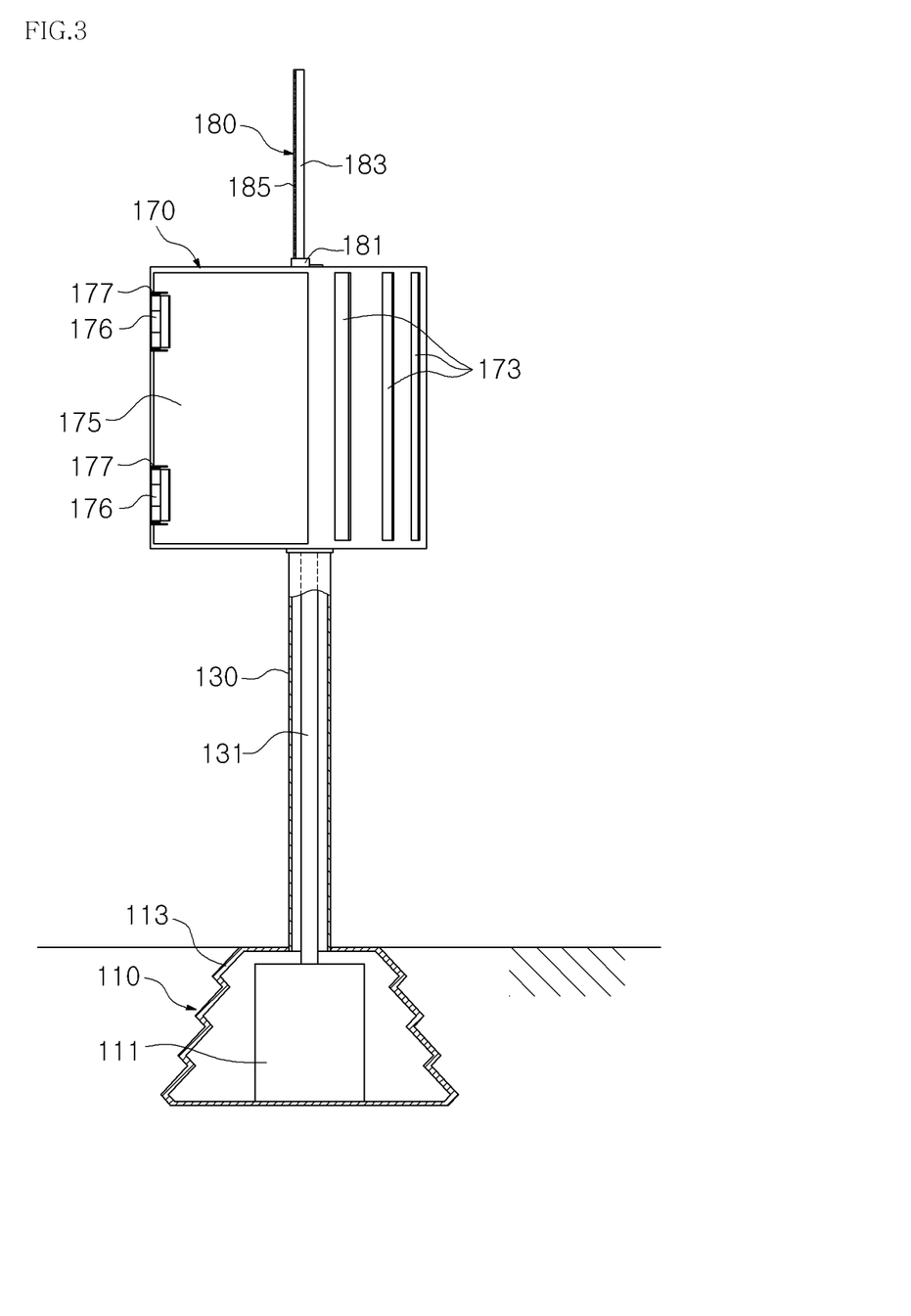
FIG. 3 is a rear view illustrating the wind-collecting type wind power generation apparatus in accordance with the embodiment of the present invention.
Figure 4:
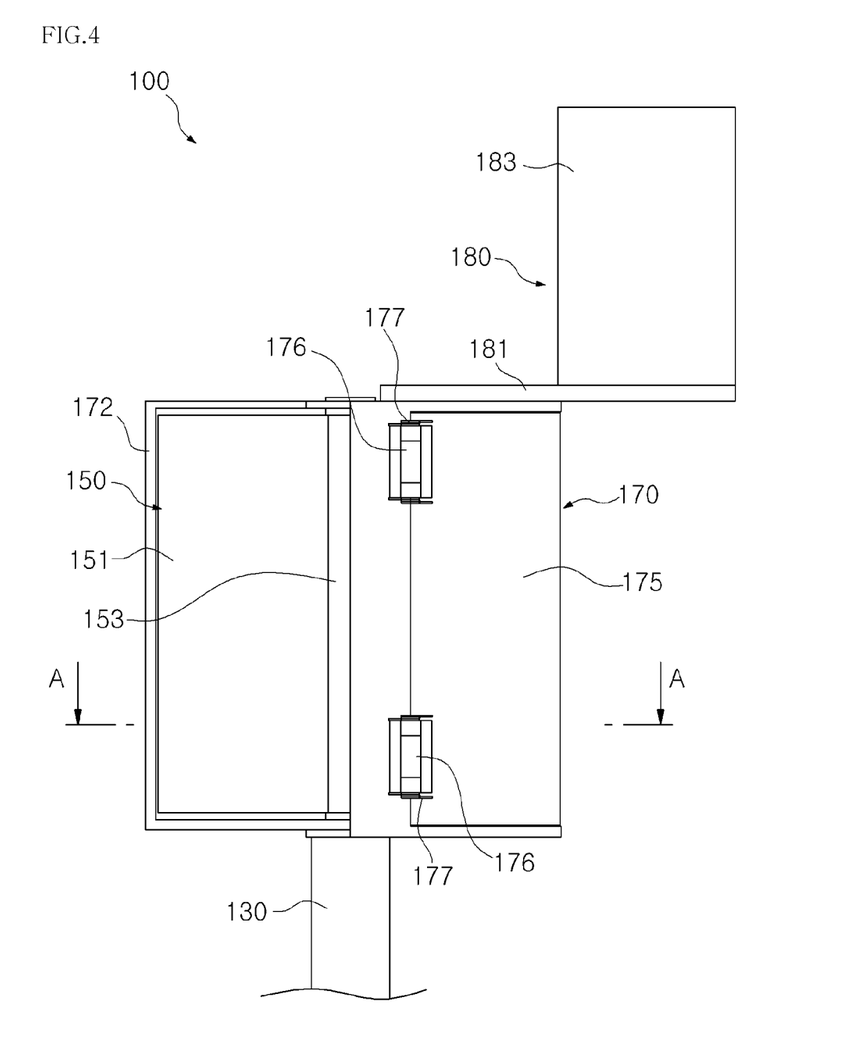
FIG. 4 is a side view illustrating the upper portion (a blade, a wind collecting guide, etc.) of the wind-collecting type wind power generation apparatus in accordance with the embodiment of the present invention.

As shown in FIGS. 1 to 3, the wind-collecting type wind power generating apparatus 100 in accordance with the embodiment of the present invention may include a power generation main body 110.

The power generation main body 110 is buried under the ground of the roadside, and may thus fix the wind-collecting type wind power generating apparatus 100 to the ground and perform power generation by rotary force of a blade 150 which will be described later.

The power generation main body 110 may include a housing 113. The housing 113 may be formed in the shape of an airtight container so as to accommodate a power generator 111 which will be described later.

Further, the outer surface of the housing 113 of the power generation main body 110 may have a prominence and depression shape. That is, the outer surface of the housing 113 having the prominence and depression shape increases a contact area between the buried portion of the power generation main body 110 and the housing 113, thereby allowing the power generation main body 110 to be firmly buried under the ground.

Here, the prominence and depression shape formed on the outer surface of the housing 113 may be regular or irregular.

In the embodiment, the outer surface of the housing 113 has a regular prominence and depression shape formed in zigzag, as seen from the side surface.

Further, the housing 113 may be formed such that the area of the housing 113 is increased in the downward direction so as to more improve support force of the wind-collecting type wind power generating apparatus 100.

The power generation main body 110 may include the power generator 111. The power generator 111 may generate power by rotary force of the blade 150 which will be described later.

The power generator 111 may include a drive shaft connected to the blade 150 performing power generation and rotated. The power generator 111 is well known in the art, and a detailed description thereof will thus be omitted.

The wind-collecting type wind power generating apparatus 100 in accordance with the embodiment of the present invention may include a support 130. The support 130 may support the blade 150 so that the blade 150 is located on the power generation main body 110 buried under the ground.

The support 130 may have a hollow cylindrical shape, and may be connected to the upper portion of the power generation main body 110. Here, the support 130 and the power generation main body 110, more particularly, the inner space of the housing 113 of the power generation main body 110, may communicate with each other.

Further, a connection shaft 131 connecting the blade 150 located at the upper end of the support 130 to the power generator 111 located within the housing 113 of the power generation main body 110 to transmit rotary force of the blade 150 to the drive shaft of the power generator 111 may be inserted into the support 130.

Figure 5:
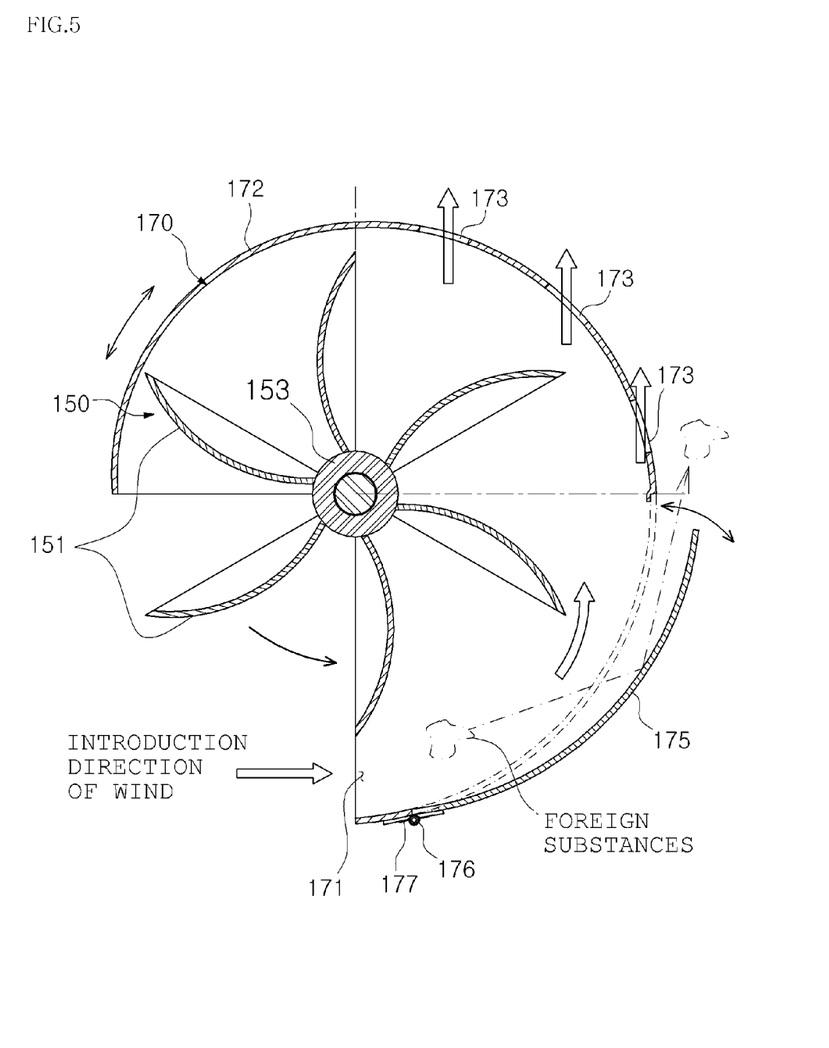
FIG. 5 is a cross-sectional view taken along the line A-A of FIG. 4, illustrating a state of the wind-collecting type wind power generation apparatus in accordance with the embodiment of the present invention, in which foreign substances are discharged through a foreign substance discharge door.

As shown in FIGS. 1 and 5, the wind-collecting type wind power generating apparatus 100 installed on the roadside in accordance with the embodiment of the present invention may include the blade 150.

Such a blade 150 is rotated by wind resistance, and may drive the power generator 111 using rotary force thereof.

Here, the blade 150 and the drive shaft of the power generator 111 are connected by the connection shaft 131 so that, when the blade 150 is rotated, the power generator 111 may be driven by rotation of the drive shaft, and the blade 150 may be rotated about a vertical axis.

The blade 150 may include a rotary shaft 153 and wings 151. The rotary shaft 153 may have a rod shape, be disposed vertically, and be connected to the connection shaft 131 to rotate the connection shaft 131.

The wings 151 meet with resistance of wind and rotate the rotary shaft 131. Here, a plurality of wings 151 may be provided in a radial manner around the rotary shaft 153.

The wing 151 has a plate shape, and the central portion of the wing 151 is concave, as seen from the top. The upper and lower ends of the wing 151 may be sealed so that wind colliding with the central portion of the wing 151 does not leak to the upper and lower portions of the wing 151.

That is, the surface of the wing 151 opposite the concave portion of the wing 151 may be opened so that air is introduced into the concave portion.

Further, the longitudinal length of the wings 151 may be extended, and when the wings 151 are disposed in a radial manner around the rotary shaft 153, the concave portions of the plural wings 151 face in one direction in which the blade 150 is rotated about the same circumference.

When wind collides with the wings 151 having the above shape, wind is collected within the concave portions of the wings 151 and thus wind resistance is maximized, thereby improving rotary force of the blade 150.

In the embodiment, six wings 151 are disposed in a radial manner around the rotary shaft 153.

If the wind-collecting type wind power generating apparatus 100 is installed on a roadside, the concave portion of the wing 151 most adjacent to the road is preferably opposite the traveling direction of vehicles.

As shown in FIGS. 2 to 5, the wind-collecting type wind power generating apparatus 100 installed on the roadside in accordance with the embodiment of the present invention may include a wind collecting guide 170. The wind collecting guide 170 may collect wind and guide the collected wind to the blade 150 to improve the rotating velocity and rotary force of the blade 150.

The wind collecting guide 170 may be formed in a shape surrounding a part of the circumference of the side surface of the blade 150, and be rotatably connected to the rotary shaft 153 of the blade 150 so as to be rotated about the rotary shaft 153 of the blade 150.

Further, the wind collecting guide 170 may be an arc-shaped plate disposed around the side surface of the blade 150, and the upper end lower ends of the wind collecting guide 170 may be bent in a direction towards the rotary shaft 153 to be rotatably connected to the rotary shaft 153.

Here, the upper and lower ends of the wind collecting guide 170 connected to the rotary shaft 153 may be formed in an open type so as to circulate wind.

Further, one end of the wind collecting guide 170 surrounding the circumference of the blade 150 may be separated from the blade 150 to form a wind inlet 171 through which wind is introduced into the wind collecting guide 170.

A separation interval between the blade 150 and the wind collecting guide 170 becomes narrowed in a direction from the wind inlet 171 to the other end of the wind collecting guide 170, thereby allowing air introduced into the wind collecting guide 170 through the wind inlet 171 to be guided to the blade 150.

Here, the wind collecting guide 170 may be formed in an arc-shaped curve shape so that wind is easily guided in a direction from the end of the wind collecting guide 170 forming the wind inlet 171 to the other end of the wind collecting guide 170 adjacent to the blade 150.

Further, the wind collecting guide 170 may include a front sealing part 172.

The front sealing part 172 seals the front portion of the blade 150 so that wind is only introduced into the wind inlet 171, thus preventing wind from being introduced in the opposite direction to the rotating direction of the blade 150.

The front sealing part 172 may be formed in a shape extended from the side surface of the blade 150 symmetrical with the wind inlet 171 with respect to the rotary shaft 153 of the blade 150 to the front of the blade 150 at a position orthogonal to the wind inlet 171. Here, the front means the opposite direction to the introduction direction of wind into the wind inlet 171.

The wind collecting guide 170 may further include wind outlets 173.

The wind outlets 173 are formed at random positions of the wind collecting guide 170 in the shape of a through hole, thus discharging wind guided by the wind collecting guide 170 to the outside.

Here, since the intensity of wind guided by the wind collecting guide 170 is rapidly decreased as the distance of wind guided by the wind collecting guide 170 is increased, the wind outlets 173 are formed so as to apply the wind guided by the wind collecting guide 170 to the blade 150, to rapidly discharge the wind to the outside and to allow new wind to be introduced into the wind collecting guide 170.

The wind outlets 173 may be formed at positions of the wind collecting guide 170 orthogonally opposite the wind inlet 171 so that wind introduced into the wind inlet 171 is guided by the wind collecting guide 170 and is discharged in a direction orthogonal to the wind inlet 171.

By forming the wind outlets 173 at these positions, wind introduced into the wind collecting guide 170 is discharged to the outside before the intensity of the wind is minimized, thereby improving rotary force of the blade 150.

Here, a plurality of wind outlets 173 may be formed.

In the embodiment of the present invention, the wind collecting guide 170 surrounds the circumference of the side surface of the blade 150 at an angle of about°, 27a0s the blade 150 is seen from the top, and is divided into three pieces having an angle of about 90° such that a foreign substance discharge door 175, the wind outlets 173 and the front sealing part 172 are sequentially located at the respective pieces (with reference to FIG. 5).

Here, the side end of the piece where the foreign substance discharge door 175 is formed may form the wind inlet 171.

As shown in FIG. 5, the wind collecting guide 170 may include the foreign substance discharge door 175.

The foreign substance discharge door 175 may prevent foreign substances introduced into the wind collecting guide 170, for example, stones ejected from the road due to traveling of vehicles, from being inserted between the wind collecting guide 170 and the blade 150 and thus damaging the blade 150 and the wind collecting guide 170.

Here, a portion of the wind collecting guide 170, more particularly, the portion of the wind collecting guide 170 opposite the wind inlet 171 may be cut out, and the foreign substance discharge door 175 may be configured so as to open or close the cut portion of the wind collecting guide 170.

The end of the foreign substance discharge door 175 may be connected to the wind collecting guide 170 so as to be rotatable about the vertical axis, thereby opening or closing the cut portion of the wind collecting guide 170.

The cut portion of the wind collecting guide 170 may be cut out up to an angle of about 90° with the wind inlet 171 in the introduction direction of wind into the wind collecting guide 170 (with reference to FIG. 5).

The foreign substance discharge door 175 may include an elastic member 177. The elastic member 177 may elastically support the foreign substance discharge door 175 on the wind collecting guide 170 so that the elastic member 177 applies elastic force in a direction of sealing the cut portion of the wind collecting guide 170 by the foreign substance discharge door 175.

That is, the elastic member 177 may support the foreign substance discharge door 175 so that the foreign substance discharge door 175 seals the cut portion of the wind collecting guide 170 by elastic force.

The elastic member 177 may be a coil spring, and one end of the coil spring may be connected to the wind collecting guide 170 and the other end of the coil spring may be connected to the foreign substance discharge door 175.

If foreign substances, such as stones, are introduced into the wind inlet 171, the foreign substances apply impact to the foreign substance discharge door 175 having the above configuration and open the cut portion of the wind collecting guide 170 by rotary force of the blade 150 due to wind as well as force of the foreign substances introduced into the wind inlet 171, and may thus be discharged to the outside of the wind collecting guide 170 through the cut portion of the wind collecting guide 170.

The wind collecting guide 170 may further include a cover steering unit 180. The cover steering unit 180 may rotate the wind collecting guide 170 against the blade 150 according to the direction of wind so that the wind inlet 171 formed between the wind collecting guide 170 and the blade 150 faces the direction of wind at all times (with reference to FIGS. 1 and 3).

The cover steering unit 180 may include an extension part 181 and a steering plate 183.

The extension part 181 extends from the wind collecting guide 170 to install the steering plate 183 thereon. The extension part 181 may extend from the upper end of the wind collecting guide 170 to a random length in the sideward direction of the wind collecting guide 170.

Here, the extension part 181 may extend in the opposite direction to the position of the wind inlet 171 with respect to the rotary axis of the wind collecting guide 170.

The steering plate 183 has a platy shape and is connected to the extension part 181. The steering plate 183 may rotate the wind collecting guide 170 against the blade 150 in the direction of wind by wind resistance.

The steering plate 183 may be installed on the extension part 181 in parallel with the introduction direction of wind into the wind inlet 171, and a reflective member 185 may be provided on the steering plate 183.

The reflective member 185 may reflect light from headlights of a vehicle at night, thus visually alerting a driver.

The reflective member 185 may be provided at one of both side surfaces of the steering plate 183, and may be formed in a pattern of a random shape.

The reflective member 185 may be formed by applying a reflective material to the steering plate 183, attaching a reflective sheet to the steering plate 183, or forming prominences and depressions on the steering plate 183.

In the cover steering unit 180 having the above configuration, since the steering plate 183 is installed on the extension part 181 extending to one side of the wind collecting guide 170 just as a tail wing of an airplane, if wind is blowing, the steering plate 183 moves in a direction opposite to the direction of wind and rotates the wind collecting guide 170 so as to overcome wind resistance.

When the wind collecting guide 170 is rotated, as described above, the wind inlet 171 is disposed in the direction opposite wind, and thus a large amount of wind may be supplied to the blade 150 through the wind collecting guide 170 according to the direction of wind.

Further, the reflective member 185 provided on the steering plate 185 may reflect light at night, and may be rotated according to the direction of wind to improve visual warning effects for drivers.

Hereinafter, the functions and effects of the above-described respective components will be described.

In the wind-collecting type wind power generating apparatus 100 installed on the roadside in accordance with the embodiment of the present invention, the power generator 111 is installed within the power generation main body 110, and the support 130 to separate the blade 150 from the ground is installed.

Further, the blade 150 is rotatably installed at the upper end of the support 130, and the rotating blade 150 drives the power generator 111 via the connection shaft 131 to perform power generation.

The wind collecting guide 170 collecting wind to supply the collected wind to the blade 150 is rotatably connected to the blade 150, and the cover steering unit 180 rotating the wind collecting guide 170 according to the direction of wind is provided on the upper portion of the wind collecting guide 170.

Further, the foreign substance discharge door 175 discharging foreign substances introduced into the wind inlet 171 is provided on the wind collecting guide 170.

The wind-collecting type wind power generating apparatus 100 installed on the roadside having the above-described configuration in accordance with the embodiment of the present invention is buried under the ground of a roadside.

Preferably, the outer surface of the housing 113 of the power generation main body 110 has a prominence and depression shape to firmly fix the wind-collecting type wind power generating apparatus 100 to the ground, and the wind inlet 171 is located adjacent to a road.

In the wind-collecting type wind power generating apparatus 100 in which the power generation main body 110 is fixed to the ground, when a vehicle travels on the road, traveling wind occurs, the blade 150 is rotated by the traveling wind, the connection shaft 131 connected to the blade 150 transmits rotary force of the blade 150 to the power generator 111, thereby performing power generation.

The traveling wind is collected by the wind collecting guide 170 and is supplied to the blade 150, and the wind collecting guide 170 is rotated by the cover steering unit 180 so that the wind inlet 171 is opposite the blowing direction of the wind.

Further, if foreign substances are introduced into the wind inlet 171, the foreign substance discharge door 175 is opened by introducing force of the foreign substances and rotary force of the blade 150, thereby discharging the foreign substances introduced into the wind collecting guide 170 to the outside.

The reflective member 185 provided on the steering plate 185 reflects light from headlights of a vehicle at night, and is rotated by the cover steering unit 180 according to the direction of wind to improve visual warning effects for drivers.

Figure 6:
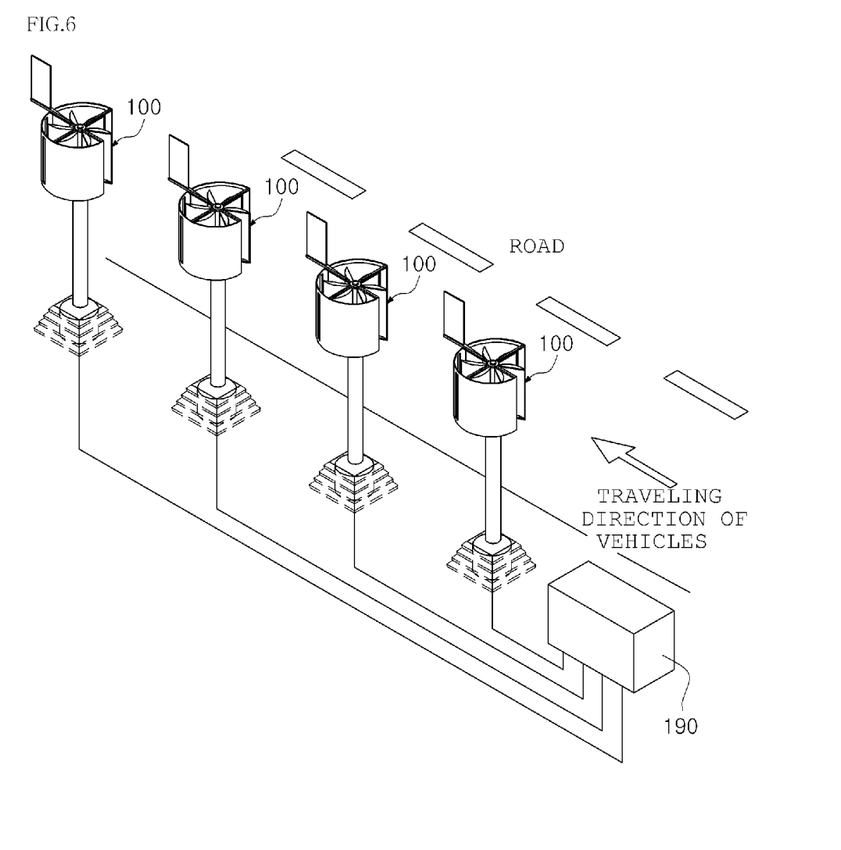
FIG. 6 is a perspective illustrating a state of the wind-collecting type wind power generation apparatus in accordance with the embodiment of the present invention, which is installed on the roadside.

Further, plural wind-collecting type wind power generating apparatuses 100 installed on the roadside may be installed such that they are separated from each other by a designated interval along the roadside, as shown in FIG. 6, and the plural wind-collecting type wind power generating apparatuses 100 may be connected to one charging unit 190 to charge a secondary battery (not shown) with electricity generated from the plural wind-collecting type wind power generating apparatuses 100.

In this case, the charging unit 190 may include a power conversion unit (not shown) to convert electricity generated from the wind-collecting type wind power generating apparatuses 100 into electricity charging the secondary battery.

As described above, the wind-collecting type wind power generating apparatuses 100 installed on the roadside in accordance with the embodiment of the present invention collects wind by the wind collecting guide 170 and then supplies the collected wind to the blade 150, thereby improving power generation efficiency.

Further, the wind inlet 171 is located in the direction opposite wind at all times by the cover steering unit 180 provided on the wind collecting guide 170, and thus power generation may be performed by wind occurring in various directions, i.e., natural wind as well as traveling wind.

Further, the foreign substance discharge door 175 discharges foreign substances to the outside, thereby preventing damages to the wind collecting guide 170 and the blade 150 due to insertion of the foreign substances between the wind collecting guide 170 and the blade 150.

Moreover, the reflective member 185 provided on the cover steering unit 180 visually alerts drivers at night, thereby preventing generation of traffic accidents.

As apparent from the above description, the present invention provides a wind-collecting type wind power generating apparatus installed on a roadside in which a wind collecting cover collecting wind and then supplying the wind to a blade is rotated according to various directions of wind to use wind in various directions and thus to improve power generation efficiency.

Further, a foreign substance discharge door discharges foreign substances introduced into a wind inlet to the outside, thereby preventing damage to the wind collecting guide and the blade due to the foreign substances.

Moreover, a reflective member provided on a steering plate reflects light from a vehicle and thus visually alerts a driver, thereby preventing generation of traffic accidents.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wind-collecting type wind power generating apparatus installed on a roadside comprising:
    a power generating main body accommodating a power generator generating electricity and buried under the ground;
    a support extending upwardly from the power generating main body;
    a blade located at the upper end of the support and rotated by wind to drive the power generator;
    a wind collecting guide provided in a shape surrounding a part of the circumference of the side surface of the blade, rotatably connected to the blade, collecting wind and guiding the wind to the blade; and
    a cover steering unit protruding from one side of the upper end of the wind collecting guide to rotate the wind collecting guide according to the direction of wind so that a wind inlet provided between the wind collecting guide and the blade to introduce wind into the wind inlet is opposite a wind blowing direction,
    wherein:
    a portion of the wind collecting guide opposite the wind inlet is partially cut out so as to discharge foreign substances introduced into the wind inlet to the outside; and
    a foreign substance discharge door opening or closing the cut portion of the wind collecting guide is provided at the cut portion of the wind collecting guide.

2. The wind-collecting type wind power generating apparatus according to claim 1, wherein the blade includes:
    a rotary shaft transmitting driving force to the power generator; and
    a plurality of wings arranged in a radial manner with respect to the rotary shaft, each wing having a concave central portion to collect wind.

3. The wind-collecting type wind power generating apparatus according to claim 1, wherein the wind collecting guide is formed such that an interval between the wind collecting guide and the blade becomes narrowed in an arc shape in a direction from one end of the wind collecting guide forming the wind inlet to the other end of the wind collecting guide.

4. The wind-collecting type wind power generating apparatus according to claim 1, wherein the wind collecting guide includes a front sealing part surrounding the side surface of the blade from a position opposite the wind inlet to a position orthogonal to the wind inlet.

5. The wind-collecting type wind power generating apparatus according to claim 1, wherein the wind collecting guide includes wind outlets discharging the wind introduced into the wind inlet to the outside of the wind collecting guide at random positions after guiding of the wind by the wind collecting guide.

6. The wind-collecting type wind power generating apparatus according to claim 1, wherein:
    the foreign substance discharge door is rotatably connected to the wind collecting guide by a hinge; and
    the foreign substance discharge door is supported by an elastic member so as to close the cut portion of the wind collecting guide by elastic force.

7. The wind-collecting type wind power generating apparatus according to claim 1, wherein the outer surface of the power generation main body has a prominence and depression shape so as to firmly fix the power generation main body to the ground.

8. The wind-collecting type wind power generating apparatus according to claim 1, wherein the cover steering unit includes:
    an extension unit extending from the upper end of the wind collecting guide in the opposite direction to the introduction direction of wind into the wind inlet; and
    a steering plate protruding in a platy shape from the extension unit and rotating the wind collecting guide via wind resistance.

9. The wind-collecting type wind power generating apparatus according to claim 8, wherein the steering plate includes a reflective member reflecting light from a vehicle traveling on a road.

* * * * *